United States Patent
Shiraki et al.

[11] Patent Number: 5,961,142
[45] Date of Patent: Oct. 5, 1999

[54] INSTRUMENT PANEL WITH AIR BAG DOOR

[75] Inventors: Tatsuo Shiraki, Anjo; Takashi Kitano, Tokyo-to, both of Japan

[73] Assignee: Kabushiki Kaisha Inoac Corporation, Aichi-ken, Japan

[21] Appl. No.: 08/917,140

[22] Filed: Aug. 25, 1997

[30] Foreign Application Priority Data

Aug. 26, 1996 [JP] Japan ................................. 8-244142

[51] Int. Cl.⁶ .................................................. B60R 21/16
[52] U.S. Cl. ...................................... 280/728.3; 280/732
[58] Field of Search ............................ 280/728.2, 728.3, 280/732

[56] References Cited

U.S. PATENT DOCUMENTS

| | | | |
|---|---|---|---|
| 4,895,389 | 1/1990 | Pack, Jr. ............................ | 280/732 |
| 5,183,289 | 2/1993 | Zeller et al. ....................... | 280/728.3 |
| 5,238,264 | 8/1993 | Barnes ............................... | 280/732 |
| 5,456,487 | 10/1995 | Daris et al. ....................... | 280/732 |
| 5,522,616 | 6/1996 | Bauer et al. ...................... | 280/732 |
| 5,560,646 | 10/1996 | Gray .................................. | 280/732 |
| 5,569,959 | 10/1996 | Cooper et al. ................... | 280/728.3 |

*Primary Examiner*—Paul N. Dickson
*Attorney, Agent, or Firm*—Armstrong, Westerman, Hattori, McLeland & Naughton

[57] ABSTRACT

An instrument panel has an air bag door to be bent and opened toward a windshield. The air bag door has a door core. An edge of the door core on the windshield side and an edge of a frame arranged on the edge of the door core on the windshield side are fixed to the windshield-side peripheral edge of an air bag opening of an instrument panel core. The door core and frame are provided with extensions on the windshield side. Each of the extensions has a rigidity-lowering opening, and an end of each extension on the windshield side has a fixing part to be fixed to the instrument panel core.

3 Claims, 7 Drawing Sheets

INSTRUMENT PANEL WITH AIR BAG DOOR

BACKGROUND OF THE INVENTION

1. Field of the Invention

The present invention relates to an instrument panel with an air bag door.

2. Description of the Related Art

FIG. 5 shows a car instrument panel P provided with an air bag door D in front of a front passenger's seat. The air bag door D is provided, on its back, with an air bag apparatus S as shown in FIG. 6. FIG. 6 is a cross-sectional view taken along a line 6—6 of FIG. 5. The air bag apparatus S consists of a folded air bag A, an igniter I, and a casing C that accommodates the air bag A and igniter I. The casing C has a top opening that is covered with the air bag door D. If the car receives a large shock due to, for example, collision, the air bag apparatus S causes the igniter I to inflate the air bag A and open the air bag door D, from behind the door D, and to expand the air bag into the car.

The instrument panel P is of a type that allows the air bag door D to bend toward a windshield and is composed of an instrument panel core 61, a foam layer 63 formed on the surface of the panel core 61, and a skin 65 disposed on the foam layer 63. In this example, the skin 65 has an easy-to-break part 66 whose shape and position correspond to those of the air bag door D and whose strength is low. When the air bag A inflates, the easy-to-break part 66 causes the foam layer 63 and skin 65 to break along the part 66, to thereby open the air bag door D as shown in FIG. 7. A reference mark T is an imaginary line along which the foam layer 63 is expected to break.

The panel core 61 is formed from, for example, hard resin into a given instrument panel back shape and has an air bag opening O, which is substantially square, at a position corresponding to the air bag door D. When the air bag A inflates, it pushes the back of the air bag door D at the opening O, opens the door D, and expands into the car. The air bag opening O is provided with an air bag door core 67. The door core 67 reinforces the back of the air bag door D, is made of a metal or synthetic resin plate having a proper thickness, and has dimensions to cover the air bag opening O. An edge of the door core 67 on a windshield side is attached to the vicinity of an edge of the air bag opening O on the windshield side with threaded members 69 such as bolts.

With this instrument panel P, an inflating air bag pushes the back of the air bag door D, and at this time, a fixed part 70 of the door core 67 collectively receives stress to deform the panel core 61 and door core 67, thereby hindering the smooth opening of the air bag door D. To solve this problem, one proposal fixes a plate-like reinforcing retainer 71 to the top of the fixed part of the door core 67, to improve the strength of the fixed part of the air bag door D. The retainer 71 is a frame having a center opening whose dimensions are substantially the same as those of the air bag opening O. The retainer 71 may be fixed to the upper periphery of the opening O so that the fixed part of the door core 67 is sandwiched between the retainer 71 and the panel core 61.

If the car is suddenly stopped or hits another car in front, the forehead of a person in the front passenger's seat may hit the instrument panel P. In this case, the retainer (frame) 71 is fixed to the panel core 61 to improve the rigidity of the panel core 61 around the air bag door D, and therefore, the panel core 61 will not break, to increase the impact on the person's head.

In the panel type that makes the air bag door D bend and open toward the windshield W as shown in FIG. 8 when the air bag inflates, the position hit by the person's head at a sudden stop substantially agrees with the fixed part 70 of the door core 67 as indicated with an arrow mark "a". In this case, the influence of the retainer (frame) 71 on the person's head is large and undesirable.

SUMMARY OF THE INVENTION

In view of these problems, an object of the present invention is to provide a car instrument panel that properly lowers the rigidity of part of an air bag door that may be hit by the forehead of a person in the car when the car makes a sudden stop or hits another car in front, while securing the smooth opening of the air bag door when an air bag inflates, thereby reducing a shock on the person's head.

In order to accomplish the object, the present invention provides an instrument panel having an air bag door to be bent and opened toward a windshield. The air bag door has a door core. An edge of the door core on the windshield side and an edge of a frame arranged on the edge of the door core on the windshield side are fixed to the windshield-side peripheral edge of an air bag opening of an instrument panel core. The door core and frame are provided with extensions on the windshield side. Each of the extensions has a rigidity-lowering opening, and an end of each extension on the windshield side has a fixing part to be fixed to the panel core.

It is preferable that the rigidity-lowering opening of the door core has a joint that divides the opening into a plurality of openings.

DESCRIPTION OF THE PREFERRED EMBODIMENTS

The present invention will be explained in detail with reference to the accompanying drawings.

Figure 1:
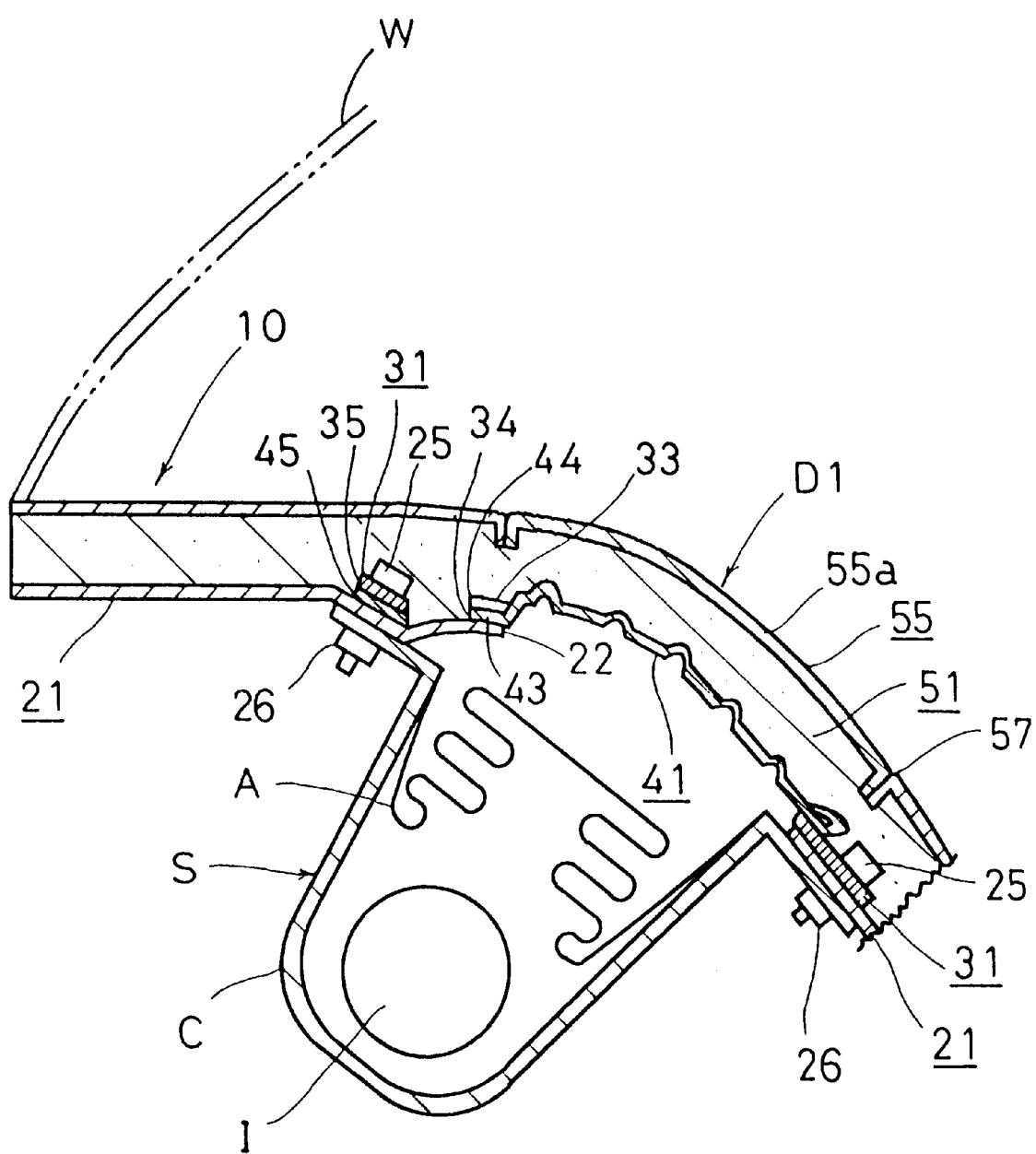
FIG. 1 is a sectional view showing an instrument panel according to an embodiment of the present invention.
Figure 6:
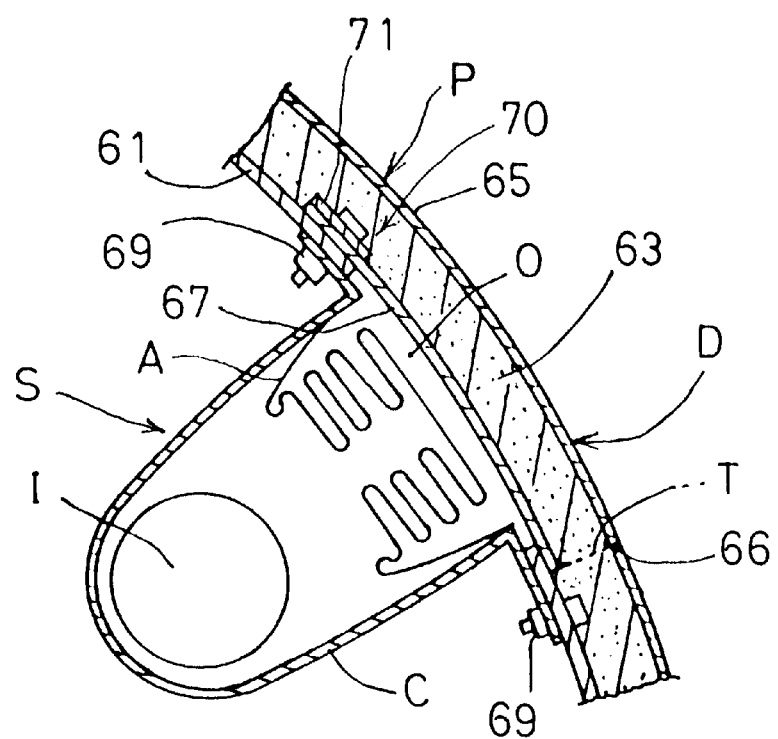
FIG. 6 is a sectional view taken along a line 6—6 of FIG. 5.
Figure 7:
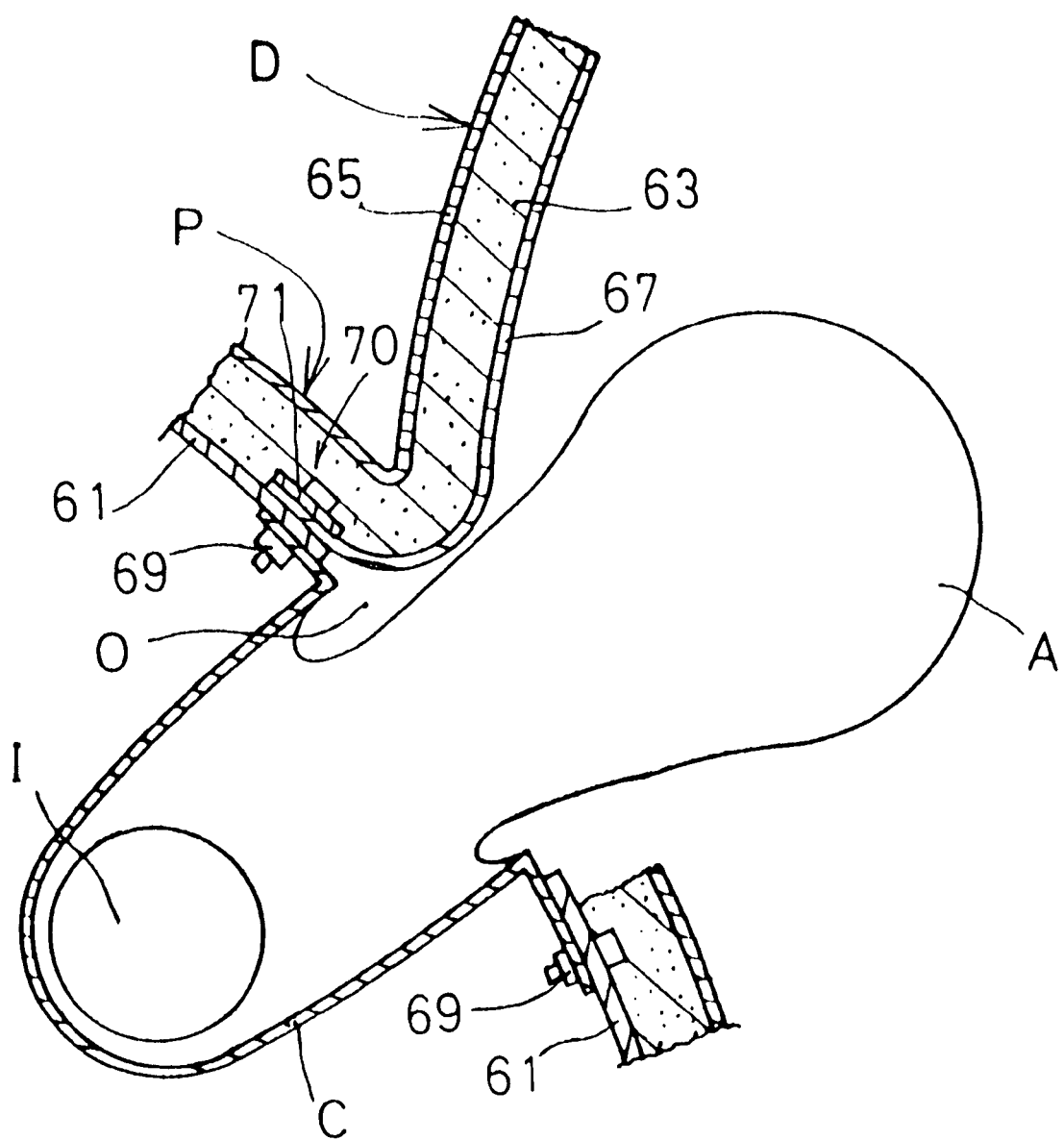
FIG. 7 is a sectional view showing an inflating air bag of the instrument panel of FIG. 6.
Figure 8:
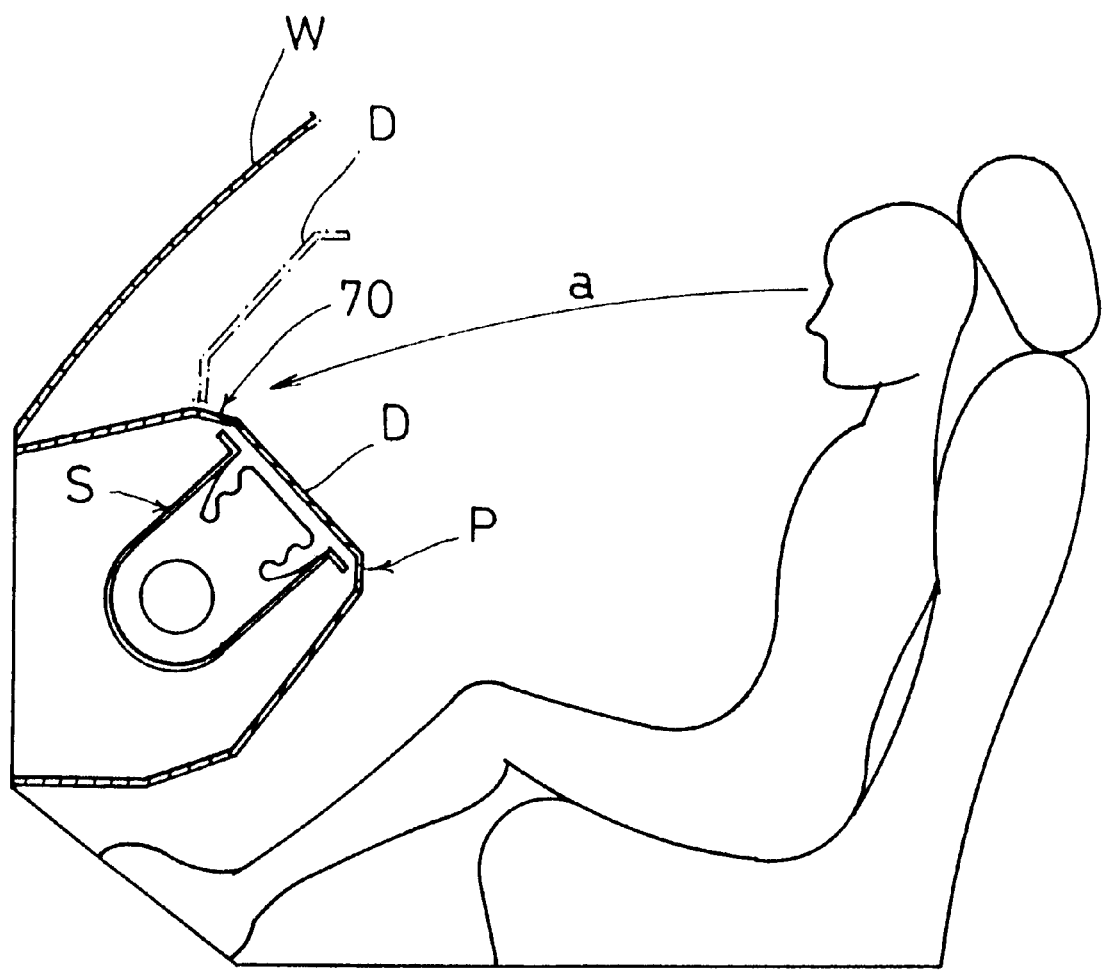
FIG. 8 is a schematic view showing the inside of a car when the forehead of a person in the car hits the instrument panel.

FIG. 1 shows an instrument panel 10 of the present invention having an air bag door D1 in front of a seat next to a driver's seat. The air bag door D1 bends and opens toward a windshield W. An air bag apparatus S is arranged on the back of the air bag door D1. The structure of the air bag apparatus S is the same as that of FIG. 6, and therefore, is provided with like reference marks.

The instrument panel 10 consists of an instrument panel core 21, a frame 31, an air bag door core 41, a foam layer 51, and a skin 55.

The panel core 21 is made from, for example, hard synthetic resin or fiber-reinforced synthetic resin by, for example, injection molding into the shape of the back of the instrument panel 10. At a predetermined position of the panel core 21 in front of the front passenger's seat, an air bag opening 22 is formed in substantially a square shape extending in a lateral direction (car width direction), to allow an air bag A to inflate and expand. An air bag casing C is attached to the bottom (back) of the air bag opening 22, and the door core 41 is attached to the top (surface) of the air bag opening 22. Fitting holes (not shown) are formed at predetermined positions around the air bag opening 22. Through the fitting holes, the casing C, frame 31, and door core 41 are fixed together with bolts 25 and nuts 26.

The frame 31 reinforces the periphery of the air bag opening 22 as well as a fixing part 45 of the door core 41, so that the pressure of an inflating air bag may not break the periphery of the air bag opening 22 and the fixing part 45. The frame 31 is made of, for example, a steel plate or an aluminum plate having a predetermined thickness. As is easily understood from FIGS. 3 and 4, the frame 31 has a center opening 32 that substantially agrees with the air bag opening 22. A side 31a of the center opening 32 on the windshield side is extended toward the windshield by a predetermined length to form an extension 33. The extension 33 has a rigidity-lowering opening 34 having a substantially square shape extending in a lateral (car width) direction. The length (in a front-to-rear direction) of the extension 33 is properly determined and is, for example, about 5 to 10 cm. An edge of the extension 33 on the windshield side forms a fixing part 35 that is used to fix the frame 31 and door core 41 to the panel core 21. The fixing part 35 has screw passing holes 36. Around the center opening 32, there are formed screw passing holes 37 that are used to strongly fix the frame 31 to the periphery of the air bag opening 22.

Figure 3:
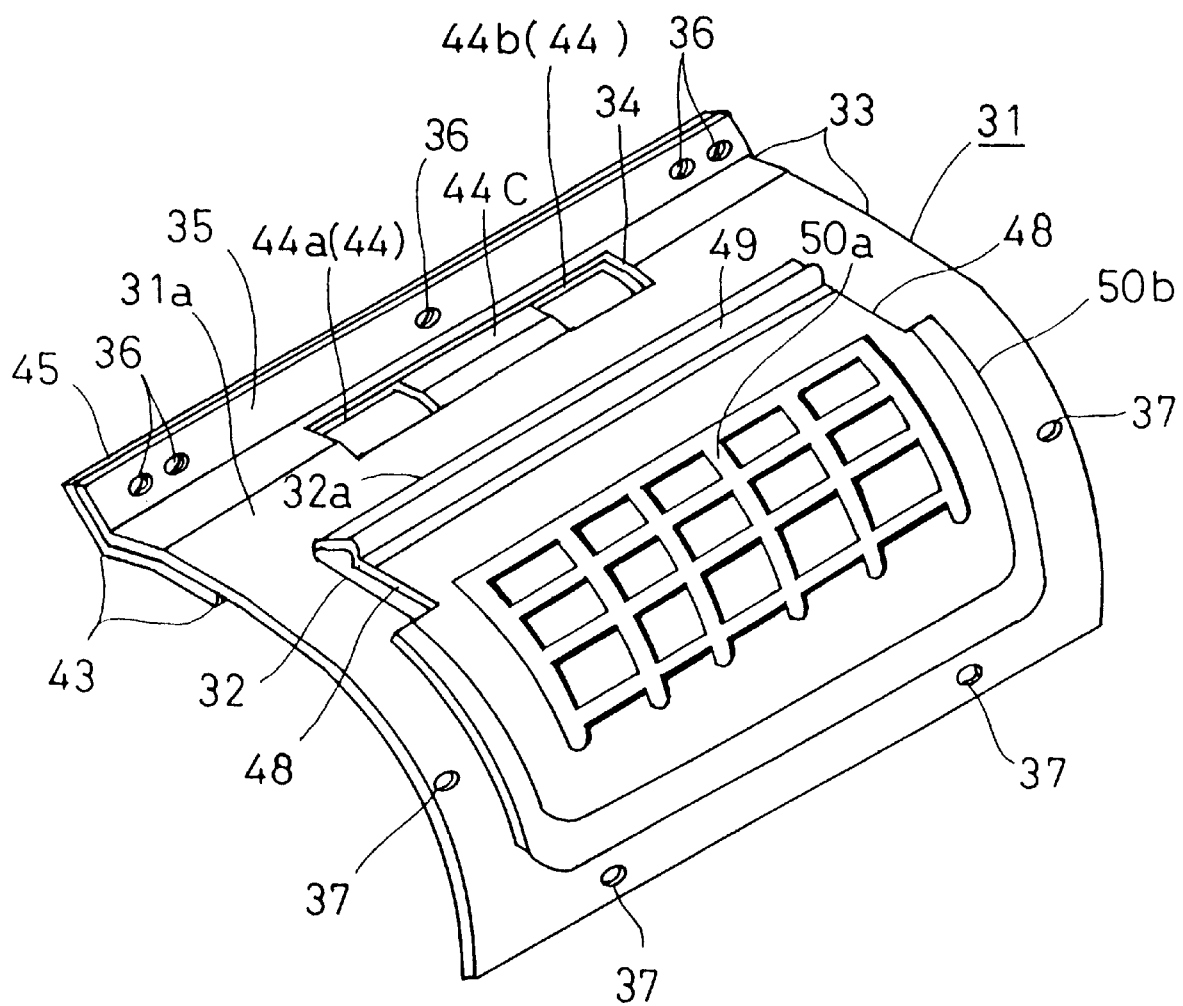
FIG. 3 is a perspective view showing a combined state of a frame and an air bag door core according to the embodiment.
Figure 4:
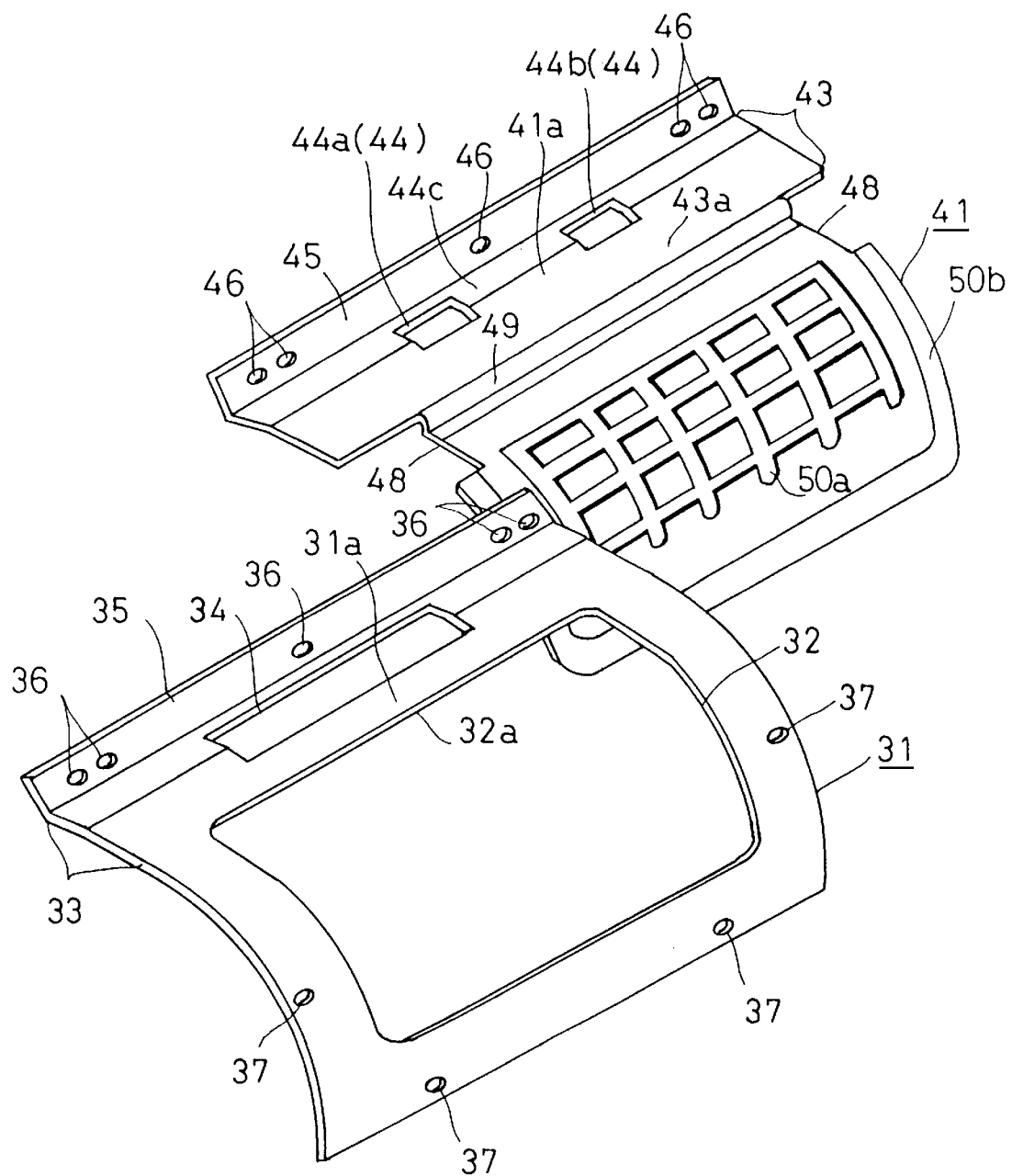
FIG. 4 is an exploded perspective view showing the frame and door core according to the embodiment.
Figure 5:
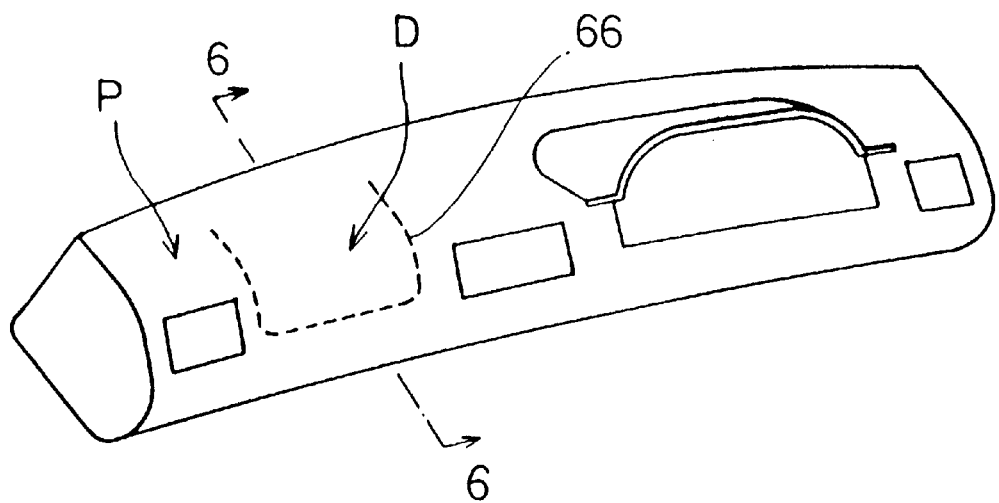
FIG. 5 is a perspective view showing a standard instrument panel having an air bag door.

The door core 41 is made of, for example, a steel plate or an aluminum plate, and as can be seen from FIGS. 3 and 4, has substantially a square shape to cover the center opening 32 of the frame 31. A side 41a of the door core 41 on the windshield side has an extension 43 that extends toward the windshield along the extension 33 of the frame 31. In this example, the central part of the door core 41 has reinforcing linear protrusions 50a arranged in a lattice pattern. Each of the protrusions 50a is curved substantially into an inverted U shape from the back toward the front of the door core 41.

Aligned with the rigidity-lowering opening 34 of the frame 31, the extension 43 of the door core 41 has a rigidity-lowering opening 44 having a substantially square shape extending in a lateral (car width) direction. To properly lower the rigidity of the extension 43, the opening 44 of this embodiment is divided by a joint 44c into two openings 44a and 44b. The joint 44c is not limited to one, and it is possible to employ a plurality of joints. A part similar to the joint 44c may be provided for the frame 31, to divide the rigidity-lowering opening 34 of the frame 31 into a plurality of openings. Preferably, the opening 34 of the frame 31 is single, and the opening 44 of the door core 41 positioned under the opening 34 is divided by the joint 44c into the two openings 44a and 44b, or more. This reduces the rigidity of the extension 43. The door core 41 is connected to the fixing part 45 through, in addition to the joint 44c, each side of the opening 44, so that, when the air bag inflates, the opening 44 may keep its shape, thereby preventing the door core 41 from elongating in an expanding direction and the joints between the door core 41 and the fixing part 45 from breaking. In addition, this arrangement collects stress at a bent 49 (to be explained later) of the door core 41 so that the air bag door D1 may more smoothly open.

An edge of the extension 43 of the door core 41 on the windshield side has the fixing part 45, which has screw passing holes 46 that are aligned with the holes 36 of the fixing part 35 of the frame 31.

The extension 43 of the door core 41 is arranged on the bottom (back) face of the extension 33 of the frame 31, and the fixing part 45 of the door core 41 is fixed to the bottom (back) face of the fixing part 35 of the frame 31 by, for example, spot welding. The door core 41 and frame 31 fixed together through the fixing parts 45 and 35 are fixed to the upper periphery of the air bag opening 22 of the panel core 21 with the use of the screw passing holes 36, 37, and 46.

When the door core 41 and frame 31 are fitted to the panel core 21, the extension 43 of the door core 41 is sandwiched between the extension 33 of the frame 31 and the panel core 21. Accordingly, when the door core 41 is pushed by an inflating air bag from below, the door core 41 easily bends upwardly into the car around a fulcrum edge 32a of the center opening 32 of the frame 31. In addition, the fixing part 45 of the door core 41 has improved strength because of the fixing part 35 of the frame 31 being present on the fixing part 45, and therefore, will never break when the door core 41 is pushed up by the inflating air bag. The extensions 43 and 33 of the door core 41 and frame 31 are in a rigidity lowered state due to the openings 44 and 34, and therefore, the strength of the instrument panel 10 at the extensions 43 and 33 is dependent on the strength of the panel core 21 and is substantially free from the influence of the door core 41 and frame 31. Even if the forehead of a person hits the door core 41, i.e., the air bag door D1 and, in particular, the extensions 43 and 33 due to, for example, a sudden stopping of the car, the rigidity-lowering openings 44 and 34 may prevent a large impact on the person's head. The panel core 21 may be set to break under a predetermined impact power, to absorb a shock on the head of a person when the car collides with something.

The door core 41 of this embodiment is formed such that the lateral width of the extension 43 is larger than the lateral width of the center opening 32 of the frame 31. The base of the extension 43 is provided with recesses 48 that do not interfere with the internal edges of the center opening 32. The recesses 48 are used to place an unfixed side of the door core 41 on the top (surface) of the frame 31 and the fixed part thereof on the bottom (back) of the frame 31. The base of the extension 43 is provided with the bent 49 having substantially an inverted U shape and extending in a lateral direction so that, when the air bag inflates, the door core 41 may easily bend along the fulcrum edge 32a of the center opening 32 of the frame 31. An edge 50b of the door core 41 that overlaps the periphery of the center opening 32 of the frame 31 is bent back.

The foam layer 51 provides the surface of the instrument panel 10 with a shock absorbing property and is laminated over the panel core 21 to which the frame 31 and door core 41 are fixed.

The skin 55 is, for example, a synthetic resin skin to protect the surface of the instrument panel 10 and provide a good appearance. In this embodiment, the skin 55 has an opening corresponding to the air bag door D1 in shape and position. Another skin cut into the shape of the air bag door D1 is joined with the skin 55, and the joint between them forms an easy-to-break part 57. The easy-to-break part 57 may be, instead of the joint of skins, a groove, a thinned part, or other means. When the air bag A inflates, the pressure of the same collects at the easy-to-break part 57, so that the skin 55 and foam layer 51 break along the contour of the air bag door D1.

The instrument panel 10 is easily formed by setting the panel core 21 attached with the frame 31 and door core 41 as well as the skin 55 of a predetermined shape in foam molds, by injecting foam material such as polyurethane material between the panel core 21 and the skin 55, and by forming the foam layer 51.

The instrument panel 10 of such structure is attached to a car body under the windshield W toward a front seat. Under a normal state with no collision, the air bag door D1 covers the opening of the air bag casing C as shown in FIG. 1. If the car makes a sudden stop, the forehead of a person sitting in a seat next to a driver's seat may hit the air bag door D1, in particular, the fixed part thereof. Then, the fixed part is in a low rigidity state due to the openings 44 and 34 formed in the extensions 43 and 33 of the door core 41 and frame 31 that are present at the fixed part, and therefore, injury to the forehead of the person will be minimized.

Figure 2:
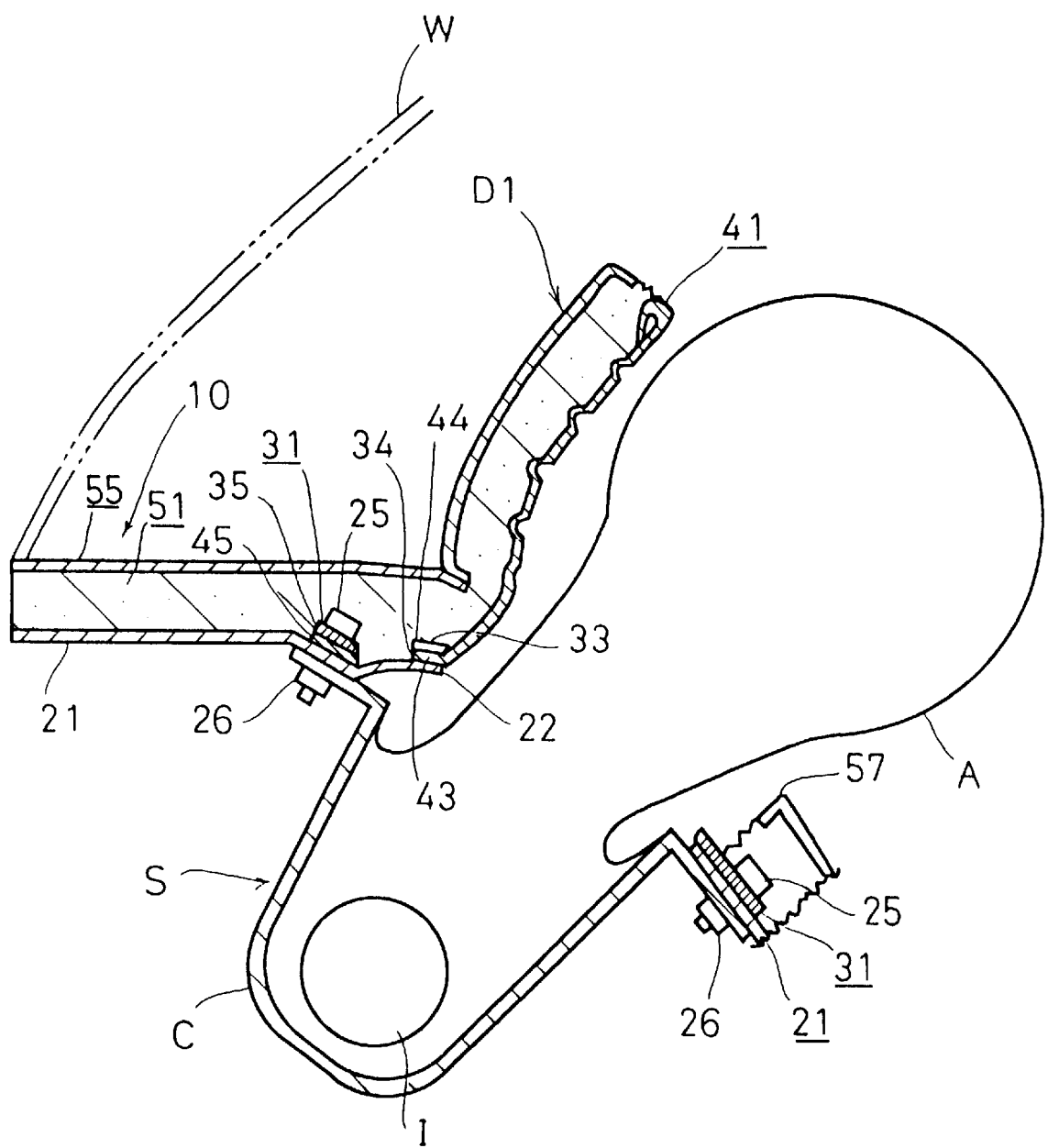
FIG. 2 is a sectional view showing an inflating air bag according to the embodiment.

If a large shock is applied to the car due to, for example, collision, the igniter I of the air bag apparatus S inflates the air bag A, which pushes upward the door core 41 on the back of the air bag door D1, as shown in FIG. 2. Since the fixing part 35 of the frame 31 is present on the fixing part 45 of the door core 41, the vicinities of the fixing part 45 never deform upwardly, and the door core 41 smoothly bends upwardly around the fulcrum edge 32a of the center opening 32 of the frame 31. As a result, the foam layer 51 and skin 55 quickly break along the easy-to-break part 57, the air bag door D1 opens toward the windshield W, and the air bag A expands into the car.

As explained above, an instrument panel of a car according to the present invention has a frame on the top face of a fixing part of an air bag door core, to provide the fixing part with sufficient strength, so that the fixing part may keep its shape when an air bag inflates to push the same, thereby securing the smooth and quick opening of an air bag door toward a windshield as well as the expansion of the air bag into the car.

The present invention provides extensions for the air bag door core and frame on a windshield side and forms rigidity-lowering openings on the extensions as well as fixing parts on the edges of the extensions. As a result, at the parts where the extensions are present, the strength of the instrument panel is not increased so much and is dependent on the strength of an instrument panel core. Accordingly, even if the forehead of a person in the car hits the air bag door due to, for example, a sudden stop, the shock on the person's head is substantially not affected by the presence of the frame, thereby minimizing injury to the person's head. In particular, in the type that allows the air bag door to open toward the windshield as in this embodiment, the position where the forehead of a person in the car hits when the car suddenly stops is frequently around the extensions where the rigidity-lowering openings are formed. This is the reason why the present invention provides a great effect.

In addition, the air bag door core and frame have lowered strength due to the extensions having the rigidity-lowering openings, and therefore, if the head of a person hits the center of the air bag door, the impact deforms the instrument panel around the extensions, to further reduce the shock on the person's head.

The strength of the instrument panel at the part where the extensions are present is dependent on the strength of the instrument panel core due to the presence of the rigidity-lowering openings. Accordingly, by providing the instrument panel core with a structure that breaks under predetermined impact, the head of a person will be safely protected by the breakage of the instrument panel core when the person's head hits the instrument panel core.

What is claimed is:

1. A vehicle instrument panel having an air bag door to be bent and opened toward a windshield on impact and shock on said vehicle by a collision, said air bag door having a door core and a frame arranged on said door core, edges of said door core and frame on a windshield side of said door core being fixed to a windshield-side peripheral edge of an air bag opening on said instrument panel core, in which:

said door core and frame are each provided on said windshield side of said door core, with an extension extending toward said windshield, said extension on each of said door core and said frame each having at least one rigidity-lowering opening, and an edge on the windshield side of each of said extensions having a fixing part fixed to said instrument panel core.

2. The instrument panel of claim 1, wherein said rigidity-lowering opening of said door core is divided by joint means into a plurality of rigidity-lowering openings.

3. A vehicle instrument panel having an air bag door to be bent and opened toward a windshield on impact and shock on said vehicle by a collision, said air bag door having a door core and a frame arranged on the door core, edges of said door core and frame on a windshield side of said door core being fixed to a windshield-side peripheral edge of an air bag opening on said instrument panel core, in which:

said frame has a center opening and said door core covers said center opening of said frame, said frame and said door core being fixed at fixing parts along a car width direction of said windshield, and a second opening of said frame and an opening of said door core are provided between said fixing parts and said air bag opening.

* * * * *